US007225241B2

(12) United States Patent
Yada

(10) Patent No.: US 7,225,241 B2
(45) Date of Patent: May 29, 2007

(54) ASSET MANAGEMENT SYSTEM AND ASSET MANAGEMENT METHOD

(75) Inventor: Noriaki Yada, Kamimashiki (JP)

(73) Assignee: Fujitsu Limited, Kawasaki (JP)

( * ) Notice: Subject to any disclaimer, the term of this patent is extended or adjusted under 35 U.S.C. 154(b) by 842 days.

(21) Appl. No.: 09/725,097

(22) Filed: Nov. 29, 2000

(65) Prior Publication Data
US 2001/0029474 A1 Oct. 11, 2001

(30) Foreign Application Priority Data
Apr. 7, 2000 (JP) .............................. 2000-107195

(51) Int. Cl.
*G06F 15/173* (2006.01)
(52) U.S. Cl. ........................................ 709/223; 707/10
(58) Field of Classification Search .................. 705/28;
709/203, 223; 707/10
See application file for complete search history.

(56) References Cited

U.S. PATENT DOCUMENTS

| | | | |
|---|---|---|---|
| 6,192,347 B1 * | 2/2001 | Graff | 705/36 |
| 6,452,504 B1 * | 9/2002 | Seal | 340/825.49 |
| 6,502,005 B1 * | 12/2002 | Wrubel et al. | 700/116 |
| 6,519,571 B1 * | 2/2003 | Guheen et al. | 705/14 |
| 6,581,045 B1 * | 6/2003 | Watson | 705/400 |
| 6,606,744 B1 * | 8/2003 | Mikurak | 717/174 |
| 6,728,708 B1 * | 4/2004 | Yotka et al. | 707/6 |
| 6,745,235 B2 * | 6/2004 | Baca et al. | 709/217 |
| 6,826,173 B1 * | 11/2004 | Kung et al. | 370/352 |

FOREIGN PATENT DOCUMENTS

| | | |
|---|---|---|
| JP | 7-50668 | 2/1995 |
| JP | A 8-69493 | 3/1996 |
| JP | A 8-195826 | 7/1996 |
| JP | A 9-265492 | 10/1997 |
| JP | A 10-149404 | 6/1998 |
| JP | A 10-283400 | 10/1998 |
| JP | A 10-312424 | 11/1998 |
| JP | 11-27285 | 1/1999 |
| JP | A 11-203352 | 7/1999 |

* cited by examiner

*Primary Examiner*—Andrew Joseph Rudy
(74) *Attorney, Agent, or Firm*—Staas & Halsey LLP

(57) ABSTRACT

A network asset manager determines sender and destination network address included in header of information circulating over a computer network, gathers network asset management information, including network asset identifying information identifying a network asset being managed and computer network node identifying information of the network asset, based upon the information circulating over the computer network, and compares the gathered network asset management information with stored network asset management information to update the stored network asset management information with the gathered network asset management information.

24 Claims, 11 Drawing Sheets

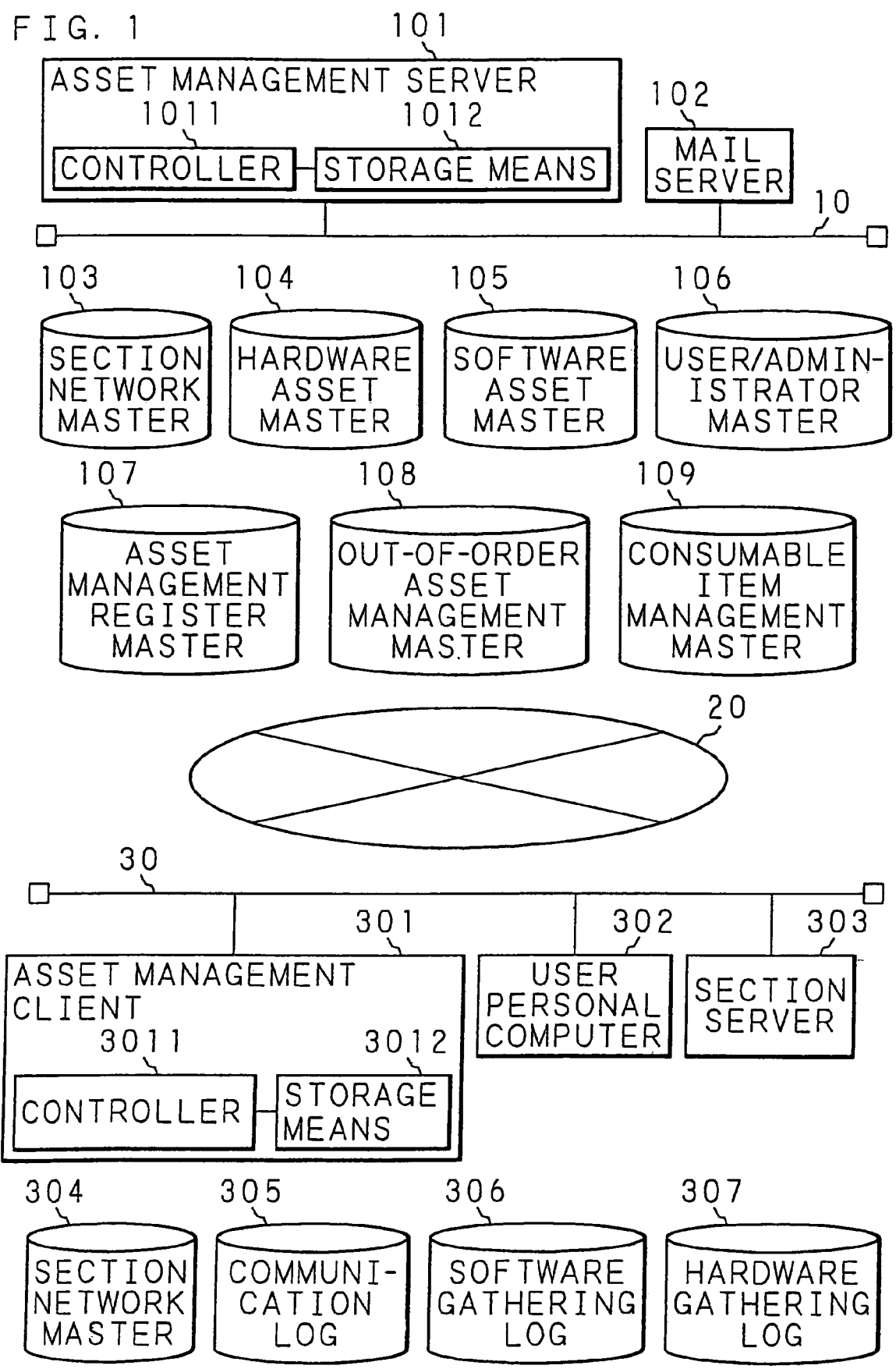

FIG. 2A SECTION NETWORK MASTER 103(304)

| SECTION CODE | SECTION NAME | SECTION SEGMENT ADDRESS(n) | ADMINISTRATOR CODE(m) | ASSET MANAGEMENT CLIENT INFORMATION |
|---|---|---|---|---|

FIG. 2B HARDWARE ASSET MASTER 104

| ASSET MANAGEMENT No. | ASSET NAME | MODEL | CLASSIFICATION (FIXED/LEASED) | DATE OF PURCHASE | DATE OF ABANDONMENT | LEASE EXPIRATION DATE |
|---|---|---|---|---|---|---|

FIG. 2C SOFTWARE ASSET MASTER 105

| ASSET MANAGEMENT No. | ASSET NAME | MODEL | CLASSIFICATION (FIXED/LEASED) | DATE OF PURCHASE | DATE OF ABANDONMENT | LEASE EXPIRATION DATE | THE NUMBER OF LICENSES | EXECUTION FORM NAME |
|---|---|---|---|---|---|---|---|---|

FIG. 2D USER/ADMINISTRATOR MASTER 106

| SECTION CODE | USER CODE | USER NAME | TEL | E-MAIL ADDRESS |
|---|---|---|---|---|

FIG. 2E ASSET MANAGEMENT REGISTER MASTER 107

| ASSET MANAGEMENT No. | USER CODE | CLASSIFICATION (HARDWARE/SOFTWARE) | IP ADDRESS | USER HOST INFORMATION | CONSUMABLE ITEM MANAGEMENT CODE |
|---|---|---|---|---|---|

FIG. 3A OUT-OF-ORDER ASSET MANAGEMENT MASTER ~ 108

| ASSET MANAGE-MENT No. | TROUBLE OCCURENCE DATE | REPAIR REQUEST DATE | REPAIR CONDI-TION | PREAR-RANGED DELIVERY DATE | DELIVERY DATE |
|---|---|---|---|---|---|

FIG. 3B CONSUMABLE ITEM MANAGEMENT MASTER ~ 109

| PART CODE | PART NAME | MODEL | NECESSARY QUANTITY | STOCK QUANTITY | ORDER QUANTITY | PREAR-RANGED DELIVERY DATE | DELIVERY DATE |
|---|---|---|---|---|---|---|---|

FIG. 4A COMMUNICATION LOG

| DATE | SENDER MAC ADDRESS | DESTI- NATION MAC ADDRESS | SENDER IP ADDRESS | DESTI- NATION IP ADDRESS | SENDER PORT No. | DESTI- NATION PORT No. | DATA PORTION (HEAD FIXED) |
|---|---|---|---|---|---|---|---|

↗ 305

FIG. 4B SOFTWARE GATHERING LOG

| DATE | USER HOST INFORMATION | IP ADDRESS | EXECUTION FORM NAME |
|---|---|---|---|

↗ 306

FIG. 4C HARDWARE GATHERING LOG

| DATE | USER HOST INFORMATION | IP ADDRESS | PART CODE |
|---|---|---|---|

↗ 307

ASSET MANAGEMENT SYSTEM AND ASSET MANAGEMENT METHOD

BACKGROUND OF THE INVENTION

The present invention relates to a system for managing an asset connectable to a computer network such as a personal computer, a facsimile or a printer, and more particularly, to an asset management system in which information on the site where an asset is currently used is gathered from information circulating over a computer network and information on software and hardware assets installed in the asset is gathered by use of a software program distributed to the asset which software program is exclusively used for the information gathering, thereby automatically updating the management information of the asset so as to be always the latest one, and further to an asset management system and an asset management method in which information on an asset being out of a consumable item is gathered, the expiration of the lease is kept watch on and the administrator, the user or the like of the asset is notified of the presence of an out-of-stock consumable item and the expiration of the lease.

In companies, when an asset such as a personal computer is purchased, generally, the name, the model, the classification (fixed asset or leased asset), the date of purchase and the lease expiration date of the asset, the code number of the section using the asset, the user's code number are registered in a master file for managing the asset. When a LAN is built in the company, an IP address privately assigned to the asset or the like is also registered. When the asset is abandoned, the date of abandonment is registered in the master file.

In a case where a purchased asset is transferred to another section after registration for a reason such as reuse of an idle asset or transfer of the user to the section, when the transfer is reported to the administrator, asset management work such as maintenance of the master file is manually performed on the computer managing the master file.

Therefore, when an asset is transferred to another section without the transfer reported to the administrator or when the administrator neglects to perform the maintenance work, the section to which the asset belongs is unknown. Consequently, at the time of inventory, for example, it is necessary to make an investigation as to whether the asset still exists and when it exists, as to in which section the asset is used now. This increases the number of man-hours of the work.

The manual maintenance of the master file after the purchase of an asset and the increase in the number of man-hours due to the investigation of a missing asset as described above lead to an increase in the TCO (total cost of ownership).

In the case of an asset such as a personal computer, it is frequently performed to newly install a software program, upgrade a software program and install additional hardware after the purchase of the main apparatus, and the management work of these software and hardware assets are also manually performed. Therefore, in a case where installation or upgrade of a software program or installation of additional hardware is not reported to the administrator, the contents of the registration disagree with the actual condition.

BRIEF SUMMARY OF THE INVENTION

The present invention is made to solve such problems, and an object thereof is to provide an asset management system and an asset management method updating the management information of an asset so as to be always the latest one at low TCO by automating as much as possible the management work that is to be performed except when the asset is purchased and when the asset is abandoned by gathering asset management information including the location of the asset from information on a sender and a destination included in the header of information circulating over a computer network, and gathering information on software and hardware assets installed in the asset with a software program created by use of an API (application program interface) capable of conversing with the OS (operating system) of an asset such as a personal computer which software program is distributed to the asset.

An asset management system according to a first aspect of the invention is an asset management system for managing an asset connectable to a computer network, comprising: storage means for storing management information of an asset including information identifying the asset and information identifying a connection node of a computer network to which the asset is connected; gathering means for gathering the management information included in information circulating over the computer network, and including information identifying an asset being managed and information identifying a connection node to which the asset is connected when it is determined that the information circulating over the computer network is information sent from the asset being managed or information addressed to the asset, based on information included in the information circulating over the computer network, to identify a sender and a destination of the information circulating over the computer network; and updating means for comparing the gathered management information with the storage contents of the storage means and when the management information and the storage contents are not the same, updating the storage contents of the storage means by the gathered management information.

Moreover, in an asset management system in which an asset management client of each section gathers management information of assets connectable to a computer network which assets belong to each section and an asset management server analyzes the management information gathered by the asset management client of each section to thereby manage assets of all the sections, the asset management server is provided with a storage medium for storing a master file where management information of an asset including information identifying each section, information identifying an asset belonging to each section and information identifying a connection node capable of connecting the asset at each section to the computer network is registered; the asset management client is provided with a storage medium for storing, in association with information identifying the belonging section of the asset management client, management information of an asset including information identifying an asset belonging to the section of the asset management client and information identifying a connection node of the computer network to which the asset is connected; and a controller connected to the storage medium, and the controller is capable of gathering the management information of the asset belonging to the section of the asset management client which management information is included in information circulating over the computer network and includes information identifying an asset, being managed, of the section of the asset management client and information identifying a connection node to which the asset is connected when it is determined that the information circulating over the computer network is information sent from the asset, being managed, of the section of the asset management client or information addressed to the assets, based on information included in the information circulating over the computer network, to identify a sender and a destination of the information circulating over the computer network; and the asset management server is further provided with a controller connected to the storage medium and the controller is capable of analyzing the management information of an asset belonging to each section which management information is gathered by the asset management client of each section, comparing the management information with the storage contents of the storage medium and when the management information and the storage contents are not the same, updating the storage contents of the storage medium by the gathered management information.

Moreover, an asset management method of this aspect of the invention is an asset management method in which an asset management client of each section gathers management information of assets connectable to a computer network which assets belong to each section and an asset management server analyzes the management information gathered by the asset management client of each section to thereby manage assets of all the sections, and comprises: a step in which the asset management server stores in a storage medium a master file where management information of an asset including information identifying each section, information identifying an asset belonging to each section and information identifying a connection node capable of connecting the asset at each section to the computer network is registered; a step in which the asset management client stores in a storage medium in association with information identifying the belonging section of the asset management client, the management information including information identifying an asset belonging to the section of the asset management client and information identifying a connection node of the computer network to which the asset is connected; a step in which the asset management client gathers the management information of an asset belonging to the section of the asset management client which management information is included in information circulating over the computer network and includes information identifying an asset, being managed, of the section of the asset management client and information identifying a connection node to which the asset is connected when it is determined that the information circulating over the computer network is information sent from the asset, being managed, of the section of the asset management client or information addressed to the asset, based on information included in the information circulating over the computer network, to identify a sender and a destination of the information circulating over the computer network; and a step in which the asset management server analyzes the management information of an asset belonging to each section which management information is gathered by the asset management client of each section, compares the management information with the storage contents of the storage medium and when the management information and the storage contents are not the same, updates the storage contents of the storage medium by the gathered management information.

In the system and the method of the first aspect of the invention, management information of an asset being managed such as the destination MAC (i.e., media access control) address and the sender MAC address as physical addresses uniquely assigned to an apparatus such as a personal computer and the destination IP (i.e., internet protocol) address and the sender IP address identifying the connection node through which the personal computer is connected to a computer network, that is, the location of the apparatus is gathered from the header of information circulating over the computer network, the gathered management information is compared with the storage contents, and when the management information and the storage contents are not the same for a reason such as transfer of the asset to another section, the storage contents is updated by the gathered management information.

Consequently, the storage contents of the asset management information is automatically updated so as to be always the latest one without the administrator of the asset performing the management work that is to be conducted except when the asset is purchased and the asset is abandoned.

In an asset management system according to a second aspect of the invention, the management information of the first aspect of the invention includes information on a software asset executed by the asset.

In an asset management system according to a third aspect of the invention, the management information of the first or the second aspect of the invention includes information on a hardware asset constituting the asset.

According to the second and the third aspects of the invention, a software program created by use of an API capable of conversing with the OS (i.e. of an asset such as the personal computer is distributed to the asset to gather information on the software and hardware assets managed by the OS of the personal computer.

Consequently, the management information of a software asset installed or updated after the purchase of the asset or the management information of an added hardware asset is automatically updated so as to be always the latest one.

In an asset management system according to a fourth aspect of the invention, the management information of any of the first to the third aspects of the invention includes information on classification as to whether the asset is a leased asset or not and information on a lease expiration date of the asset, further comprising: means for comparing a current date and the lease expiration date of the asset and means for providing a notification that the lease has expired when it is detected that the lease has expired as a result of the comparison by the comparing means.

According to the fourth aspect of the invention, information as to whether the asset is a leased asset or not and information on the lease expiration date are stored as the management information of the asset, the information on the lease expiration date of the asset is compared with the current date, and when it is detected that the lease has expired, the administrator, the user or the like of the asset is notified of this.

Consequently, a notification that the lease has expired is provided without the administrator performing the management work except when the asset is purchased and the asset is abandoned.

In an asset management system according to a fifth aspect of the invention, the management information of any of the first to the fourth aspects of the invention includes information on an amount of stock, a lower limit of amount of stock and an amount of replenishment at one time of a consumable item consumed by the asset, the gathering means is provided with means for gathering information on the asset being out of a consumable item, and the updating means is provided with: means for, when it is detected that the asset is out of a consumable item, determining whether the amount of stock becomes less than the lower limit after replenishment of the consumable item or not; and means for providing a notification that the consumable item is short of stock when the amount of stock becomes less than the lower limit.

According to the fifth aspect of the invention, information on the amount of stock, the lower limit of amount of stock and the amount of replenishment at one time of a consumable item such as ink consumed by an asset such as a printer is stored as management information of the asset, the asset gathers information on the asset being out of a consumable stock by detecting, for example, blinking of a lamp notifying the user that the asset is out of the consumable item, and in a case where the amount of stock becomes less than the lower limit after replenishment of the consumable item when it is detected that the asset is out of the consumable item, a notification that the consumable item is short of stock provided to the administrator, the user or the like of the asset.

Consequently, the administrator, the user or the like is notified of a consumable item being short of stock without the management work of the consumable item being performed, so that the consumable item can be always in stock.

The above and further objects and features of the invention will more fully be apparent from the following detailed description with accompanying drawings.

BRIEF DESCRIPTION OF THE SEVERAL VIEWS OF THE DRAWING

FIG. 1 is a structural view of an asset management system of the present invention;

FIGS. 2A through 2E are views (1) of the record formats of masters;

FIGS. 3A through 3B are views (2) of the record formats of masters;

FIGS. 4A through 4C are views of the record formats of logs;

DETAILED DESCRIPTION OF THE INVENTION

Figure 5:
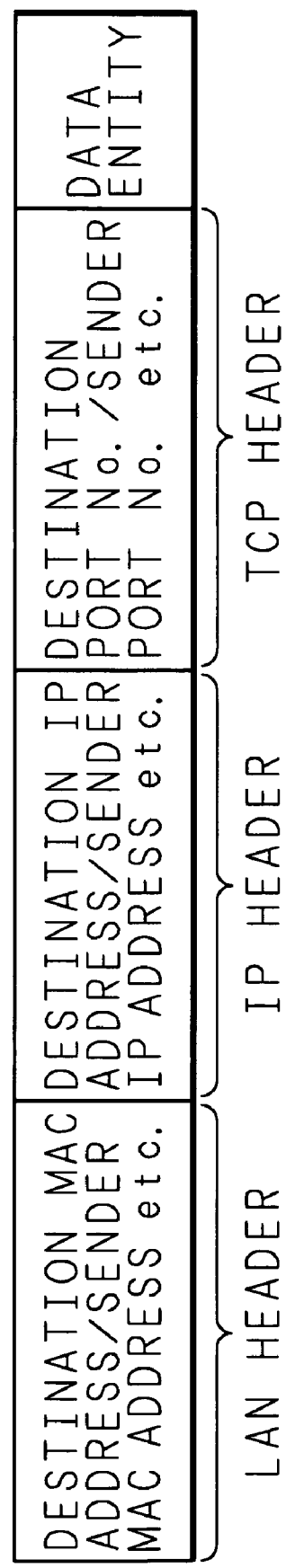
FIG. 5 is a view of the frame format.

FIG. 1 is a structural view of an asset management system of the present invention (hereinafter, referred to as the present invention system). FIGS. 2 and 3 are views of the record formats of masters. FIG. 4 is a view of the record formats of logs.

To a basic LAN 10, the following are connected: an asset management server 101 (comprising a controller 1011 and a storage 1012) that analyzes the management information of all the assets of the company which management information is gathered and distributed by an asset management client 301 (comprising a controller 3011 and a storage means 3012) of each section by a procedure described later to the asset management server 101, and updates the asset management information registered in a hardware asset master 104, a software asset master 105, an asset management register master 107 and the like to be always the latest information; and a mail server 102 that sends various notifications (that an asset is unregistered, that a consumable item is short of stock, and the like) described later to the managers, the users or the like of the assets in a mail format. The computer network to which the mail server 102 is connected is not limited to the basic LAN 10.

When an asset is purchased, initial information is registered in a section network master 103, the hardware asset master 104, the software asset master 105, a user/administrator master 106 and the asset management resister master 107 by the administrator. The registered information is automatically updated to the latest one by the asset management server 101 except when the asset is purchased and when the asset is abandoned.

The section network master 103 is provided with, as shown in FIG. 2A, registration items such as the section code, the section name, the section segment address, the administrator code and the asset management client information of each section.

The hardware asset master 104 is provided with, as shown in FIG. 2B, registration items such as the asset management number, the asset name, the model, the classification (fixed asset or leased asset), the date of purchase, the date of abandonment and the lease expiration date of each hardware asset.

The software asset master 105 is provided with, as shown in FIG. 2C, registration items such as the asset management number, the asset name, the model (including the version), the classification (fixed asset or leased asset), the date of purchase, the date of abandonment, the lease expiration date, the number of licenses and the name of the execution form of each software asset.

The user/administrator master 106 is provided with, as shown in FIG. 2D, registration items such as the section code, the user code, the user name, the telephone number (TEL) and the email address of each employee.

The asset management register master 107 is provided with, as shown in FIG. 2E, registration items such as the asset management number, the user code, the classification (hardware or software), the IP address, the user host information and the consumable item management code (when a consumable item is required) of each asset.

An out-of-order asset management master 108 is provided with, as shown in FIG. 3A, registration items such as the asset management number, the date of occurrence of the trouble, the date when a request for repair is made, the repair condition, the prearranged date of delivery and the date of delivery of an out-of-order asset.

A consumable item management master 109 is provided with, as shown in FIG. 3B, registration items such as the part code, the part name, the model, the necessary number (the lower limit of amount of stock and the amount of replenishment at one time), the number of items in stock, the quantity of order, the prearranged date of delivery and the date of delivery of each consumable item.

To the basic LAN 10, a section LAN 30 of each section is connected through a network 20 such as the Internet.

The asset management client 301 connected to the section LAN 30 gathers management information such as the destination MAC (i.e., media access control) address or the sender MAC address and the destination IP (i.e., internet protocol) address or the sender IP address included in the header from information circulating over the network 20 and addressed to or transmitted from an asset such as a user personal computer 302, a section server 303 or the like of the belonging section of the asset management client 301, and distributes the gathered information to the asset management server 101.

The position where the asset management client 301 is placed is not limited to on the section LAN 30; the client 301 may be placed in any position, for example, in a router connecting the LANs together as long as the information circulating between the network 20 and the section LAN 30 passes through the position without fail.

A section network master 304 is distributed from the asset management server 101 to the asset management client 301 of each section, and the registration items thereof are similar to those of the section network master 103 shown in FIG. 2A.

A communication log 305 comprises, as shown in FIG. 4A, data items such as the date of communication, the sender MAC address, the destination MAC address, the sender IP address, the destination IP address, the sender port number, the destination port number and data portion (the head fixed).

A software gathering log 306 comprises, as shown in FIG. 4B, data items such as the date of gathering, the user host information, the IP address (of an installed asset) and the name of the execution form.

A hardware gathering log 307 comprises, as shown in FIG. 4C, data items such as the date of gathering, the user host information, the IP address (of an incorporated asset) and the part code.

Next, a communication information gathering procedure of the present invention system will be described with reference to the frame format of FIG. 5 and the flowchart of FIG. 6.

Figure 6:
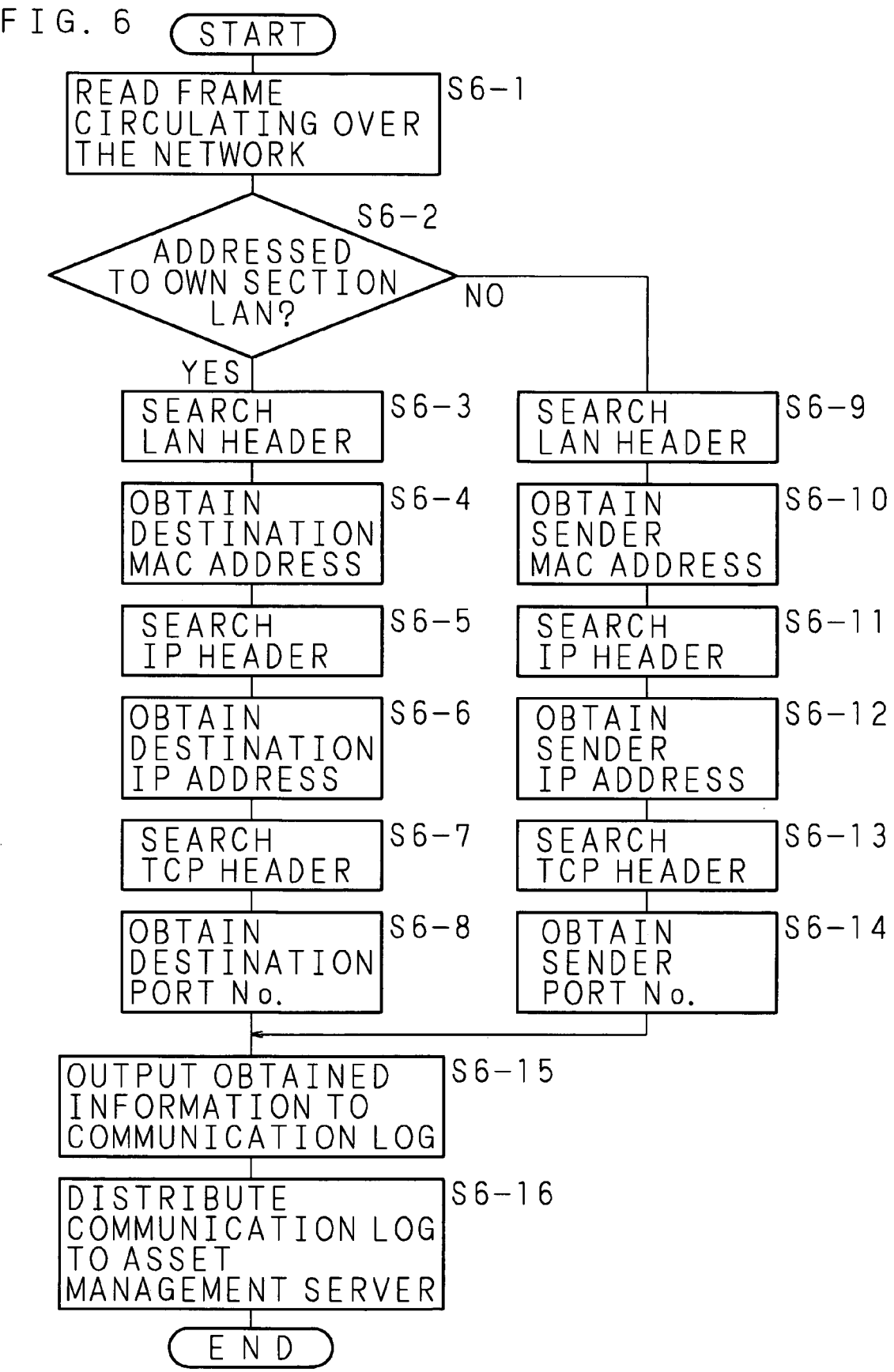
FIG. 6 is a flowchart of a communication information gathering procedure.

The basic LAN 10, the network 20 and the section LAN 30 adopt a communication protocol circulating information in units of blocks called frames, and the format thereof is defined as shown in FIG. 5.

First, a frame circulating over the network is read (step S6-1) and whether the frame is addressed to the LAN of the belonging section of the asset management client 301 or not is determined (step S6-2).

When the frame is addressed to the LAN of the belonging section of the asset management client 301, the LAN header is searched (step S6-3) and the destination MAC address is obtained (step S6-4). Then, the IP header is searched (step S6-5) and the destination IP address is obtained (step S6-6). Then, the TCP header is searched (step S6-7) and the destination port number is obtained (step S6-8).

When it is determined at step S6-2 that the frame is addressed to another section, the LAN header is searched (step S6-9) and the sender MAC address is obtained (step S6-10). Then, the IP header is searched (step S6-11) and the sender IP address is obtained (step S6-12). Then, the TOP (i.e., transmission control protocol) header is searched (step S6-13) and the sender port number is obtained (step S6-14).

The obtained information is output to the communication log 305 (step S6-15) and the communication log 305 is distributed to the asset management server 101 at an appropriate time (step S6-16).

Figure 7:
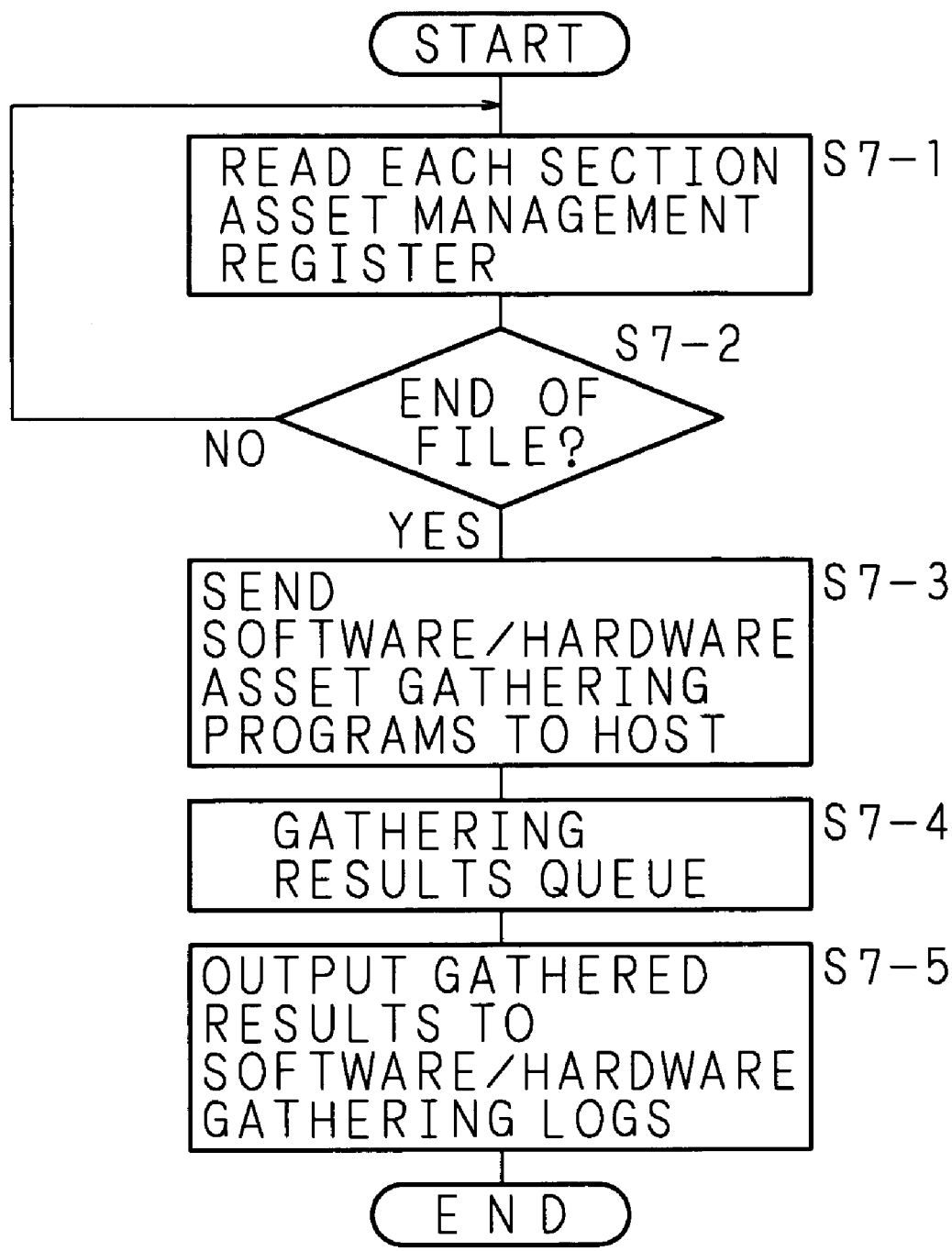
FIG. 7 is a flowchart of a software/hardware information gathering procedure.

Next, a software/hardware information gathering procedure of the present invention system will be described with reference to the flowchart of FIG. 7.

The registered information of the asset management register master 107 of each section is read until the file ends (steps S7-1 and S7-2) and a software/hardware asset gathering program created by use of an API capable of conversing with the OS of the asset is sent to the host (step S7-3).

The process waits until all the gathering results are obtained (S7-4) and the obtained gathering results are output to the software and hardware gathering logs 306 and 307 (step S7-5).

Figure 8:
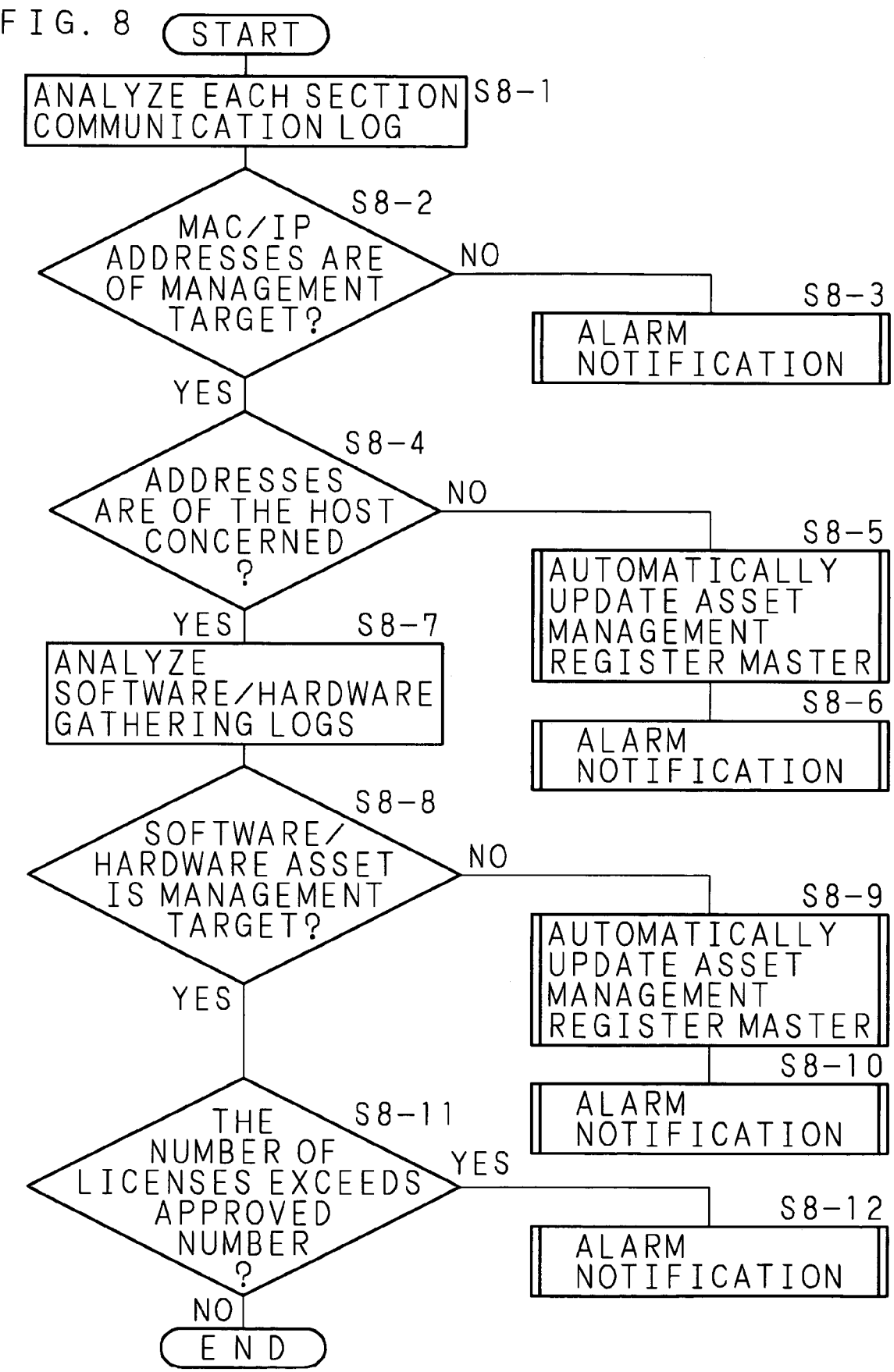
FIG. 8 is a flowchart of a gathered information analysis procedure.

Next, a gathered information analysis procedure of the present invention system will be described with reference to the flowchart of FIG. 8.

The communication log 305 of each section is analyzed (step S8-1) and whether the MAC address and the IP address are those of an asset being managed or not is determined (step S8-2). When the addresses are not those of an asset being managed, since an asset being not managed such as an asset obtained by means other than purchase is connected to the section LAN, an alarm notification that the asset should be registered in the asset management register master 107 is provided to the administrator, the user or the like (step S8-3).

When it is determined at step S8-2 that the addresses are those of an asset being managed, whether the addresses are those of the host concerned or not is determined (step S8-4). When the addresses are not those of the host concerned, since the asset is one having been transferred to another section, the contents of the registration of the asset management register master 107 are automatically updated (step S8-5) and an alarm notification that the contents of the registration have been automatically updated is provided to the administrator, the user or the like of the asset (step S8-6).

Then, the software or the hardware gathering log 306 or 307 of each section is analyzed (step S8-7) and whether the software or the hardware asset is one being managed or not is determined (step S8-8). When the asset is not one being managed, since it is, for example, a newly installed or upgraded software asset or an added hardware asset, the contents of the registration of the asset management register master 107 is automatically updated (step S8-9) and an alarm notification that the contents of the registration have been automatically updated is provided to the administrator, the user or the like of the asset (step S8-10).

When it is determined at step S8-8 that the software or the hardware asset is one being managed, only in the case of a software asset, whether the number of licenses exceeds approved number or not is determined (step S8-11). When the number of licenses exceeds the approved number, an alarm notification that the software asset is unauthorizedly used is provided to the administrator, the user or the like of the asset (step S8-12).

Figure 9:
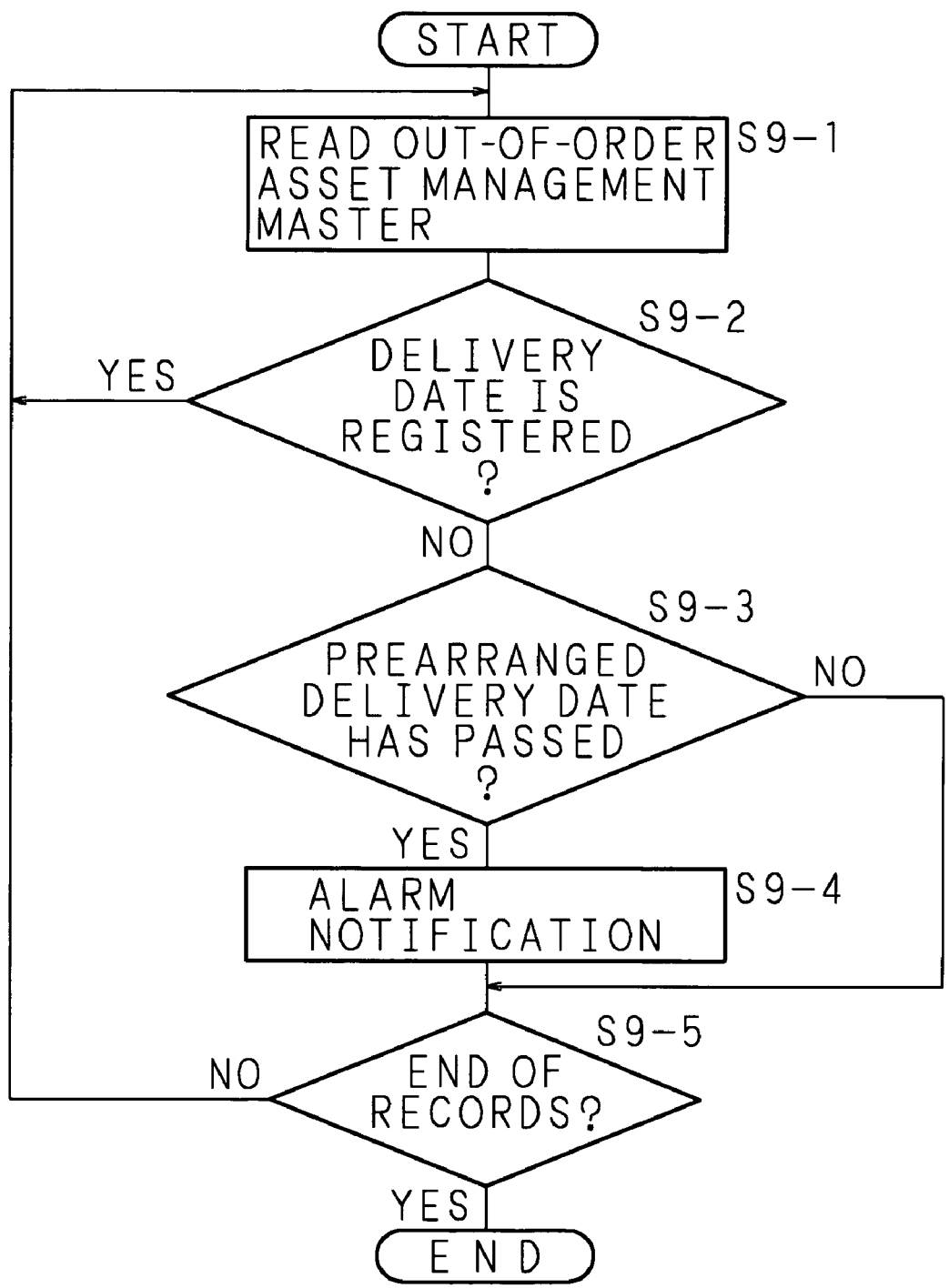
FIG. 9 is a flowchart of an out-of-order asset management master monitoring procedure.

Next, an out-of-order asset management master updating procedure of the present invention system will be described with reference to the flowchart of FIG. 9.

For example, the out-of-order asset management master 108 is read record by record with a frequency such as once a day (step S9-1) and whether data is registered for the item of the date of delivery or not is determined (step S9-2). When data is registered, the next record is read.

When no data is registered for the item of the date of delivery in the read record, whether the current date is later than the prearranged date of delivery or not is determined (step S9-3). When the current date is later, an alarm notification notifying this is provided to the administrator, the user or the like of the asset (step S9-4). When the current date is not later, the process proceeds to step S9-5.

Steps S9-1 to S9-4 are repeated until all the records end, and when all the records of the out-of-order asset management master 108 end (YES of step S9-5), the process is ended.

Figure 10:
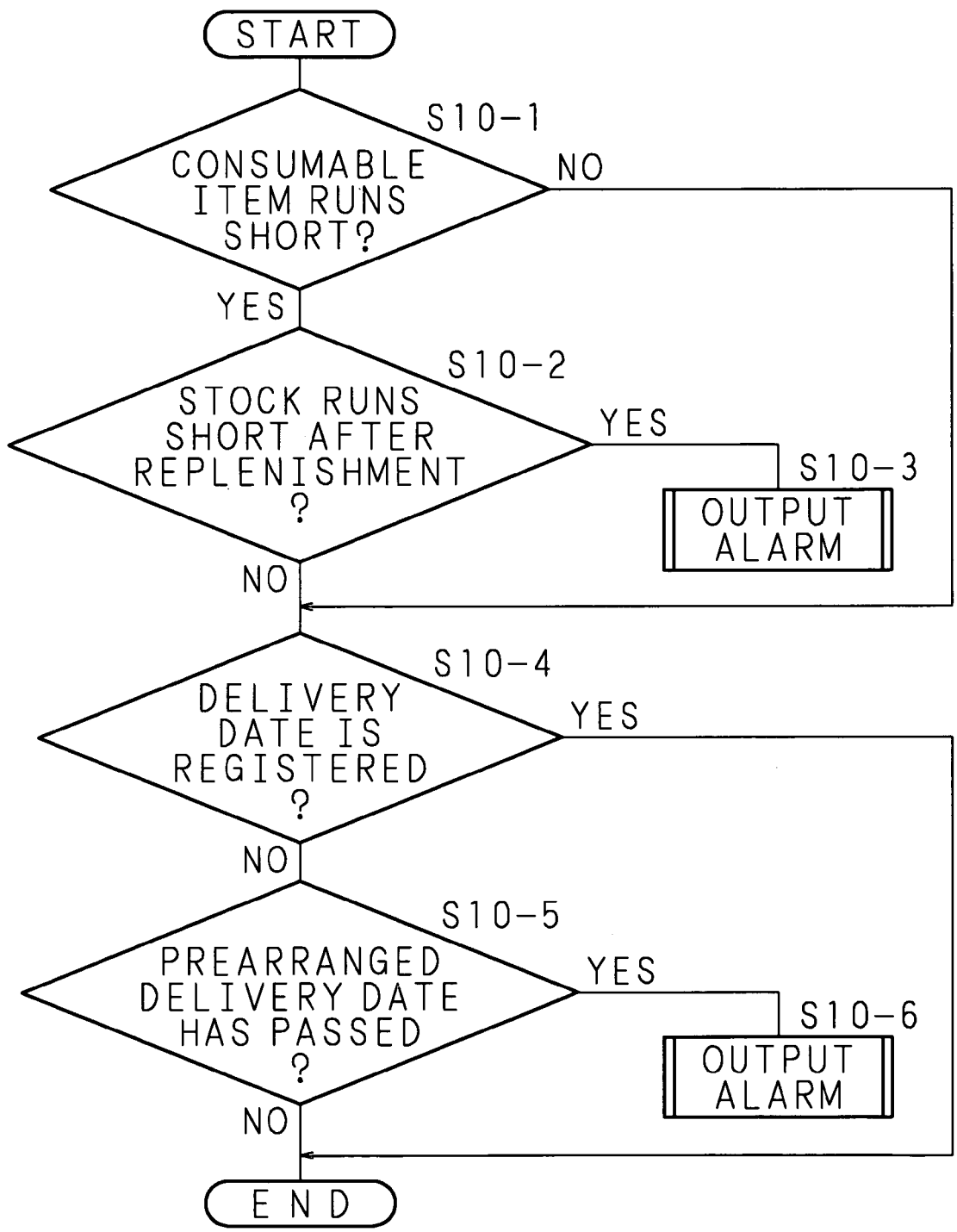
FIG. 10 is a flowchart of a consumable item management master monitoring procedure.

Next, a consumable item management master monitoring procedure of the present invention system will be described with reference to the flowchart of FIG. 10.

The consumable item management master 109 is read, and an asset such as a printer detects a lamp or the like blinking to notify the user that the asset is out of a consumable item, thereby determining whether the asset is out of the consumable item or not (step S10-1). When the asset is not out of the consumable item, the process proceeds to step S10-4.

When the asset is out of the consumable item, the information on the amount of replenishment at one time registered in the consumable item management master 109 is subtracted from the number of items in stock to determine whether or not the number of items in stock becomes less than the lower limit to be insufficient after the replenishment (step S10-2).

When the number of items in stock becomes insufficient after the replenishment, an alarm notification that the consumable item is short of stock is provided to the administrator, the user or the like of the asset (S10-3).

When the number of items in stock does not become insufficient after the replenishment, whether data is registered for the item of the date of delivery or not is determined for all the consumable items (step S10-4).

When data is registered for the item of the date of delivery, the process is ended. When no data is registered, whether the current date is later than the prearranged date of delivery or not is determined (step S10-5). When the current date is later, an alarm notification notifying this is provided to the administrator, the user or the like of the asset (step S10-6). When the current date is not later, the process is ended.

The work may be performed in conjunction with a separately constructed consumable item automatically ordering system in such a manner that the alarm notification that a consumable item is short of stock is provided from the asset management system to the ordering system and receiving this alarm notification, the ordering system automatically orders the consumable item.

Figure 11:
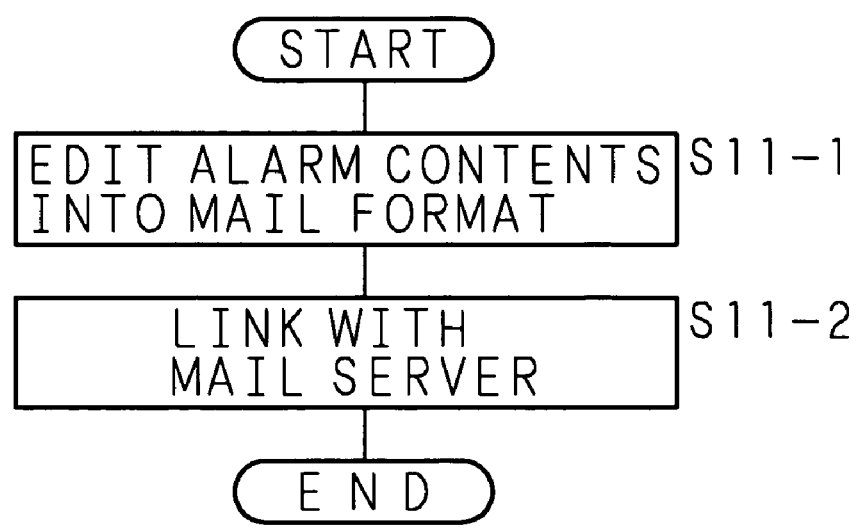
FIG. 11 is a flowchart of an alarm notification procedure.

Next, an alarm notification procedure of the present invention system will be described with reference to the flowchart of FIG. 11.

The alarm contents (automatic update, unauthorized use of a software program, presence of an out-of-stock consumable item, delay in delivery or the like) is edited into a mail format (step S11-1), and is linked with the mail server 102 (step S11-2), the notification is sent to the administrator, the user or the like of the asset.

The computer program for the asset management as described above may be provided by preinstalling it on a computer or may be provided through a portable record medium such as a CD-ROM or an MO. Further, the program may be provided through a communication line.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall CD-ROM or an MO. Further, the program may be provided through a communication line.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An asset management system for managing a network asset communicably connectable to a computer network, said asset management system comprising:

storage means for storing management information of the network asset communicably connectable to the computer network, including network asset identifying information identifying the network asset and computer network node identifying information of the network asset identifying the network asset on the computer network to which the network asset is communicably connected;

determining means for determining sender and destination network address of information circulating over the computer network and for determining whether said information circulating over the computer network is information sent from the network asset being managed or information addressed to the network asset being managed;

gathering means for gathering network asset management information, including network asset identifying information identifying the network asset being managed and computer network node identifying information of the network asset based upon the information circulating over the computer network, when determined by said determining means that the information circulating over the computer network is information sent from the network asset being managed or information addressed to the network asset being managed; and updating means for comparing the gathered network asset management information with the stored network asset management information and when the gathered network asset management information and the stored network asset management information are not same, updating the stored network asset management information with the gathered network asset management information.

2. An asset management system according to claim 1, wherein said management information includes information on a software asset executed by the asset.

3. An asset management system according to claim 1, wherein said management information includes information on a hardware asset constituting the asset.

4. An asset management system according to claim 2, wherein said management information includes information on a hardware asset constituting the asset.

5. An asset management system according to claim 1, wherein said management information includes information on classification as to whether the asset is a leased asset or not and, if it is, information on a lease expiration date of the asset, further comprising;

means for comparing a current date and the lease expiration date of the asset, and means for providing a notification that the lease has expired when it is detected that the lease has expired as a result of the comparison by the comparing means.

6. An asset management system according to claim 2, wherein said management information includes information on classification as to whether the asset is a leased asset or not and information on a lease expiration date of the asset, further comprising:

means for comparing a current date and the lease expiration date of the asset, and means for providing a notification that the lease has expired when it is detected that the lease has expired as a result of the comparison by the comparing means.

7. An asset management system according to claim 3, wherein said management information includes information on classification as to whether the asset is a leased asset or not and if it is, information on a lease expiration date of the asset, further comprising:

means for comparing a current date and the lease expiration date of the asset, and
means for providing a notification that the lease has expired when it is detected that the lease has expired as a result of the comparison by the comparing means.

8. An asset management system according to claim 4, wherein said management information includes information on classification as to whether the asset is a leased asset or not and information on a lease expiration date of the asset, further comprising:
means for comparing a current date and the lease expiration date of the asset, and
means for providing a notification that the lease has expired when it is detected that the lease has expired as a result of the comparison by the comparing means.

9. An asset management system according to claim 1, wherein said management information includes information on an amount of stock, a lower limit of amount of stock and an amount of replenishment at one time of a consumable item consumed by the asset, said gathering means is provided with means for gathering information on the asset being out of a consumable item, and said updating means is provided with: means for, when it is detected that the asset is out of a consumable item, determining whether the amount of stock becomes less than the lower limit after replenishment of the consumable item or not; and means for providing a notification that the consumable item is short of stock when the amount of stock becomes less than the lower limit.

10. An asset management system according to claim 2, wherein said management information includes information on an amount of stock, a lower limit of amount of stock and an amount of replenishment at one time of a consumable item consumed by the asset, said gathering means is provided with means for gathering information on the asset being out of a consumable item, and said updating means is provided with: means for, when it is detected that the asset is out of a consumable item, determining whether the amount of stock becomes less than the lower limit after replenishment of the consumable item or not; and means for providing a notification that the consumable item is short of stock when the amount of stock becomes less than the lower limit.

11. An asset management system according to claim 3, wherein said management information includes information on an amount of stock, a lower limit of amount of stock and an amount of replenishment at one time of a consumable item consumed by the asset, said gathering means is provided with means for gathering information on the asset being out of a consumable item, and said updating means is provided with: means for, when it is detected that the asset is out of a consumable item, determining whether the amount of stock becomes less than the lower limit after replenishment of the consumable item or not; and means for providing a notification that the consumable item is short of stock when the amount of stock becomes less than the lower limit.

12. An asset management system according to claim 4, wherein said management information includes information on an amount of stock, a lower limit of amount of stock and an amount of replenishment at one time of a consumable item consumed by the asset, said gathering means is provided with means for gathering information on the asset being out of a consumable item, and said updating means is provided with: means for, when it is detected that the asset is out of a consumable item, determining whether the amount of stock becomes less than the lower limit after replenishment of the consumable item or not; and means for providing a notification that the consumable item is short of stock when the amount of stock becomes less than the lower limit.

13. An asset management system according to claim 5, wherein said management information includes information on an amount of stock, a lower limit of amount of stock and an amount of replenishment at one time of a consumable item consumed by the asset, said gathering means is provided with means for gathering information on the asset being out of a consumable item, and said updating means is provided with: means for, when it is detected that the asset is out of a consumable item, determining whether the amount of stock becomes less than the lower limit after replenishment of the consumable item or not; and means for providing a notification that the consumable item is short of stock when the amount of stock becomes less than the lower limit.

14. An asset management system according to claim 6, wherein said management information includes information on an amount of stock, a lower limit of amount of stock and an amount of replenishment at one time of a consumable item consumed by the asset, said gathering means is provided with means for gathering information on the asset being out of a consumable item, and said updating means is provided with: means for, when it is detected that the asset is out of a consumable item, determining whether the amount of stock becomes less than the lower limit after replenishment of the consumable item or not; and means for providing a notification that the consumable item is short of stock when the amount of stock becomes less than the lower limit.

15. An asset management system according to claim 7, wherein said management information includes information on an amount of stock, a lower limit of amount of stock and an amount of replenishment at one time of a consumable item consumed by the asset, said gathering means is provided with means for gathering information on the asset being out of a consumable item, and said updating means is provided with: means for, when it is detected that the asset is out of a consumable item, determining whether the amount of stock becomes less than the lower limit after replenishment of the consumable item or not; and means for providing a notification that the consumable item is short of stock when the amount of stock becomes less than the lower limit.

16. An asset management system according to claim 8, wherein said management information includes information on an amount of stock, a lower limit of amount of stock and an amount of replenishment at one time of a consumable item consumed by the asset, said gathering means is provided with means for gathering information on the asset being out of a consumable item, and said updating means is provided with: means for, when it is detected that the asset is out of a consumable item, determining whether the amount of stock becomes less than the lower limit after replenishment of the consumable item or not; and means for providing a notification that the consumable item is short of stock when the amount of stock becomes less than the lower limit.

17. The asset management system according to claim 1, further comprising:
an asset management client connected at a position through which information circulating via the computer network passes; and means for detecting that an asset not being managed is connected to the network and activating an alarm notification upon such detection.

18. An asset management system according to claim 1, further comprising:
a communication log of each section storing data items including sender and destination addresses of information circulating over the network; and
means for detecting whether the addresses are those of an asset being managed and when an asset not being managed is detected alerting an administrator.

19. An asset management system according to claim 18, further comprising:
means for determining whether an asset has been transferred, automatically updating the contents of the asset registration and producing an alarm notification when the contents of the registration of the asset manager register master have been automatically updated.

20. An asset management system according to claim 1, further comprising:
a software/hardware log connected at a position through which information circulating via the network passes; and
means for analyzing the log and automatically updating the content of the asset management register using the log.

21. An asset management system according to claim 1, further comprising:
a section asset master storing asset licenses; and
means for checking the licenses when it is determined that the software asset is one being managed.

22. An asset management system for managing a network asset communicably connectable to a computer network, said asset management system comprising:
a storage medium storing management information of the network asset communicably connectable to the computer network, including network asset information identifying the network asset and computer network node identifying information of the network asset to identify the network asset on a computer network to which the network asset is communicably connected;
a controller in communication with said storage medium, and performing processes comprising:
(i) determining sender and destination network address of information circulating over the computer network and determining whether said information circulating over the computer network is information sent from the network asset being managed or information addressed to the network asset being managed;
(ii) gathering network asset management information, including network asset identifying information identifying the network asset being managed and computer network node identifying information of the network asset, based upon the information circulating over the computer network, when determined by said determining that the information circulating over the computer network is information sent from the network asset being managed or information addressed to the network asset being manage; and
(iii) comparing the gathered network asset management information with the stored network asset management information and when the gathered network asset management information and the stored network asset management information are not same, updating the stored network asset management information with the gathered network asset management information.

23. An asset management system in which clients of network sections and a server are in communication by a computer network, the system comprising:
an asset management client in each network section to gather network asset management information of network assets communicably connectable to and belonging to each corresponding network section and
an asset management server in communication with each asset management client by the computer network to analyze the network asset management information gathered by each asset management client of each network section and to manage network assets of all the network sections wherein:
said asset management server comprises a storage medium for storing a master file registering network asset management information of the network assets, said network asset management information including network section identifying information identifying each network section, network asset identifying information identifying the network asset belonging to each network section and network section node identifying information identifying a connection node capable of connecting the asset at each section to the the network asset on the network section to which the network asset belongs,
said asset management client comprises a storage medium for storing, based upon sender and destination network address of information circulating over the computer network, in association with network section information identifying a belonging network section of said network asset management client, network asset management information of the network asset including network asset identifying information identifying the network asset belonging to the network section of said asset management client and network section node identifying information identifying the network asset on the network section to which the network asset belongs,
said asset management client further comprises a controller to perform a process comprising:
gathering, from the information circulating over the computer network, the network asset management information of each network asset belonging to each network section of each asset management client, network asset management information including information identifying the network asset, being managed, of the network section of said asset management client and network section node identifying information identifying a the network asset on the network section to which the network asset belongs, when determined that the information circulating over the computer network is information sent from the network asset, being managed, of the network section of said asset management client or information addressed to the network asset,
said asset management server further comprises a controller to perform a process comprising:
comparing the network asset management information of each network asset belonging to each network section gathered by the asset management client of each network section with the master file network asset management information, and when the gathered network asset management information and the master file network asset management information are not same according to the comparing, updating the master file network asset management information with the gathered management information.

24. An asset management system for managing a network asset communicably connectable to a computer network, said asset management system comprising:
- a storage unit to store management information of the network asset communicably connectable to the computer network, including network asset identifying information identifying the network asset and computer network node identifying information to identify the network asset on the computer network to which the network asset is communicably connected;
- a determining unit sender and destination network address of information circulating over the computer network and for determining whether said information circulating over the computer network is information sent from the network asset being managed or information addressed to the network asset being managed;
- a gathering unit gathering network asset management information, including network asset identifying information identifying the network asset being managed and computer network node identifying information identifying of the network asset, based upon the information circulating over the computer network, when determined by said determining that the information circulating over the computer network is information sent from the network asset being managed or information addressed to the network asset being managed; and
- an updating unit to compare the gathered network asset management information with the stored network asset management information and to update the stored network asset management information according to the comparison.

* * * * *

UNITED STATES PATENT AND TRADEMARK OFFICE
CERTIFICATE OF CORRECTION

| | |
|---|---|
| PATENT NO. | : 7,225,241 B2 |
| APPLICATION NO. | : 09/725097 |
| DATED | : May 29, 2007 |
| INVENTOR(S) | : Noriaki Yada |

It is certified that error appears in the above-identified patent and that said Letters Patent is hereby corrected as shown below:

Column 10, Line 20, Claim 20 change "asset" to --asset,--.

Column 10, Line 47, Claim 5 change "comprising;" to --comprising:--.

Column 13, Line 60, Claim 22 change "being manage" to --being managed--.

Column 14, Line 16, Claim 23 change "sections" to --sections,--.

Column 14, Line 25-27, Claim 23 after "information identifying" delete "a connection node capable of connecting the asset at each section to the".

Column 14, Line 48, Claim 23 after "client," insert --the--.

Column 14, Line 52, Claim 23 before "the" delete "a".

Column 14, Line 59, Claim 23 after "asset," insert --and--.

Signed and Sealed this

Twenty-fourth Day of June, 2008

JON W. DUDAS
*Director of the United States Patent and Trademark Office*